(12) United States Patent
Hedley et al.

(10) Patent No.: US 9,081,626 B2
(45) Date of Patent: Jul. 14, 2015

(54) METHOD AND APPARATUS FOR CONVERTING SOFTWARE

(75) Inventors: David Hedley, Holly Springs, NC (US); Mark Rodriguez, Southwest Ranches, FL (US)

(73) Assignee: Renesas Electronics America Inc., Santa Clara, CA (US)

( * ) Notice: Subject to any disclaimer, the term of this patent is extended or adjusted under 35 U.S.C. 154(b) by 873 days.

(21) Appl. No.: 12/772,477

(22) Filed: May 3, 2010

(65) Prior Publication Data

US 2011/0271247 A1 Nov. 3, 2011

(51) Int. Cl.
*G06F 9/45* (2006.01)

(52) U.S. Cl.
CPC .......................... *G06F 8/51* (2013.01)

(58) Field of Classification Search
CPC ......................................................... G06F 8/51
USPC .......................................................... 717/137
See application file for complete search history.

(56) References Cited

U.S. PATENT DOCUMENTS

| | | | | |
|---|---|---|---|---|
| 4,282,584 | A | * | 8/1981 | Brown et al. ................... 714/48 |
| 5,551,015 | A | * | 8/1996 | Goettelmann et al. ......... 717/137 |
| 6,120,553 | A | * | 9/2000 | Sidwell ........................... 717/151 |
| 7,240,342 | B1 | * | 7/2007 | Bharadwaj et al. ............ 717/158 |
| 7,275,240 | B2 | * | 9/2007 | Cole et al. ...................... 717/137 |
| 2001/0018764 | A1 | * | 8/2001 | Davis et al. ......................... 717/7 |
| 2002/0026633 | A1 | * | 2/2002 | Koizumi et al. ............... 717/146 |
| 2003/0056203 | A1 | * | 3/2003 | Micco et al. ................... 717/137 |
| 2003/0198339 | A1 | * | 10/2003 | Roy et al. .................. 379/387.01 |
| 2010/0033692 | A1 | * | 2/2010 | Watanabe et al. ............... 353/85 |

OTHER PUBLICATIONS

Aho, Sethi, and Ullman, "Compilers: Principles, Techniques, and Tools", 1986, Addison-Wesley, ISBN 0-201-10088-6, Chapters 1 and 10.*

Dunfield Developement Services Inc., "Xtools Package; A Set of Cross Assemblers, Disassemblers and Monitors", http/www.dumfield.com/products/xtools.htm, Printed Mar. 19, 2010, Updated Jun. 29, 2009.

STMicroelectronics, Microcontroller Division Application Team, "AN1106 Application Note: Translating Assembly Code from HCO5 to ST7," pp. 1-9; 2000.

* cited by examiner

*Primary Examiner* — James D Rutten
(74) *Attorney, Agent, or Firm* — Campbell Stephenson LLP

(57) ABSTRACT

A method, apparatus, and computer readable medium are provided. According to an embodiment of the invention, a method includes, translating source code written in a first language into source code written in an intermediary language. The method further includes converting the source code written in the intermediary language into source code written in a second language by applying contextual recognition and reconstruction to the source code written in the intermediary language to generate the source code written in the second language. The method further includes prompting a user to customize the conversion of the source code written in the intermediary language into the source code written in the second language.

24 Claims, 10 Drawing Sheets

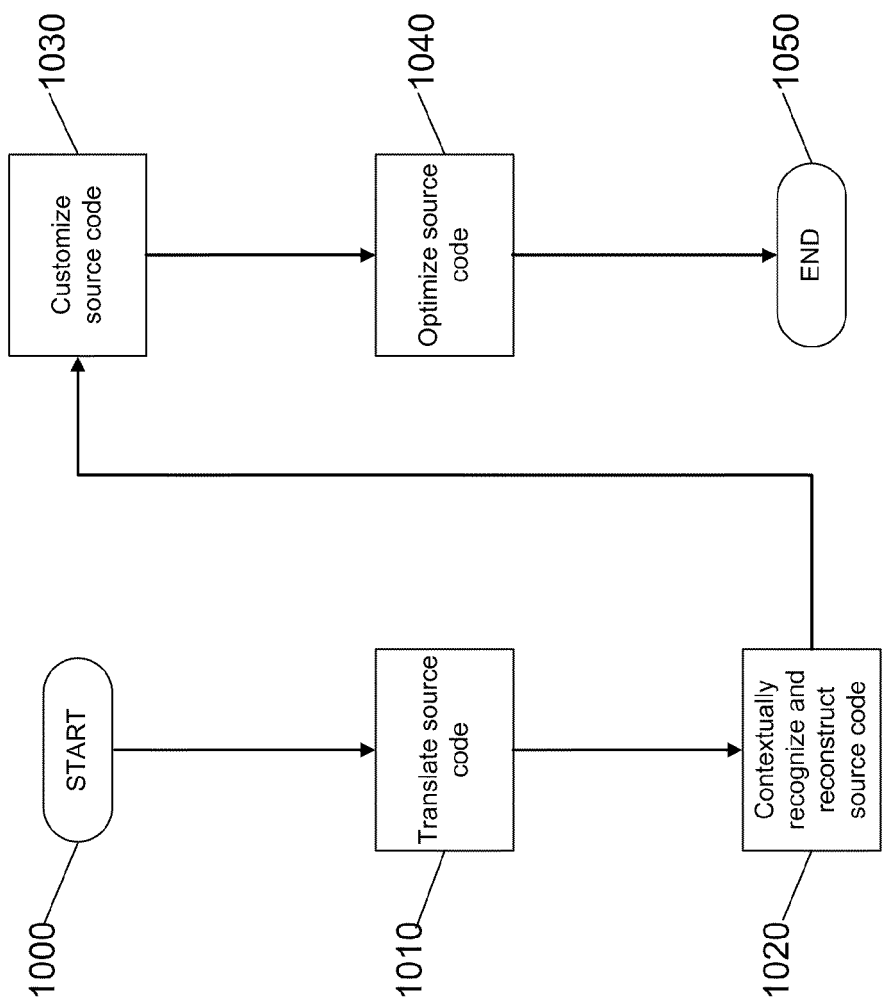

METHOD AND APPARATUS FOR CONVERTING SOFTWARE

BACKGROUND

1. Field

Embodiments of the present invention generally relate to a method and apparatus for converting software. More specifically, certain embodiments of the present invention relate to a method and apparatus for converting assembly language software.

2. Description of the Related Art

Software written for programming computers, microprocessors, microcontrollers, and other hardware is often written in a low-level language known as assembly language. A program, or source code, written in assembly language includes a series of opcode mnemonics, when translated by an assembler, that correspond to a stream of executable instructions that can be loaded into a memory and executed. Assembly language implements a symbolic representation of numeric machine codes and other constants needed to program the hardware, and thus, is generally written in an architecture-specific manner defined by the hardware's manufacturer. For this reason, an assembly language is generally not easily portable from one manufacturer's device to another manufacturer's device.

Previous conversion tools were based on a literal translation mechanism which mapped each instruction in a first assembly language to a corresponding instruction in a second assembly language. Thus, the literal translation mechanism acts like a dictionary, providing a literal translation of each instruction from one language to another language. However, the literal translation mechanism does not take into consideration the context of each instruction. For example, to set a baud rate of a peripheral in source code written in a first assembly language may require three instructions, but, in a second assembly language, the same command to set the baud rate of the peripheral may require five instructions. If the three instructions from the first assembly language are merely literally translated, the resulting instructions in the second assembly language are insufficient to set the baud rate of the peripheral, as the fourth and fifth instruction in the second assembly language are missing. Thus, previous literal translation tools generally result in only about a 60%-70% accurate source code conversion rate.

SUMMARY

According to an embodiment of the invention, a method includes, translating source code written in a first language into source code written in an intermediary language. The method further includes converting the source code written in the intermediary language into source code written in a second language by applying contextual recognition and reconstruction to the source code written in the intermediary language to generate the source code written in the second language. The method further includes prompting a user to customize the conversion of the source code written in the intermediary language into the source code written in the second language.

According to another embodiment, an apparatus includes a memory configured to store instructions and a processor configured to execute the instructions stored on the memory. The processor is further configured, when executing the instructions stored on the memory, to translate source code written in a first language into source code written in an intermediary language. The processor is further configured, when executing the instructions stored on the memory, to convert the source code written in the intermediary language into source code written in a second language by applying contextual recognition and reconstruction to the source code written in the intermediary language to generate the source code written in the second language. The processor is further configured, when executing the instructions stored on the memory, to prompt a user to customize the conversion of the source code written in the intermediary language into the source code written in the second language.

According to another embodiment, a computer readable medium having a computer program stored thereon that, when executed by a processor, causes the processor to implement a method. The method includes translating source code written in a first language into source code written in an intermediary language. The method further includes converting the source code written in the intermediary language into source code written in a second language by applying contextual recognition and reconstruction to the source code written in the intermediary language to generate the source code written in the second language. The method further includes prompting a user to customize the conversion of the source code written in the intermediary language into the source code written in the second language.

According to another embodiment, a method includes converting source code written in a first language into source code written in a second language by applying contextual recognition and reconstruction to the source code written in the first language to generate the source code written in the second language. The method further includes prompting a user to customize the conversion of the source code written in the intermediary language into the source code written in the second language.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 10 illustrates another flow diagram according to an embodiment of the invention.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

As previously described, previous conversion tools based on a literal translation mechanism act like a dictionary, and provide a literal translation of each instruction from one language to another language. However, previous conversion tools based on a literal translation mechanism do not perform a contextual analysis of the instructions being translated, and thus, lead to translation inaccuracies.

Thus, according to an embodiment of the invention, a method, apparatus, and computer readable medium is provided, where an intelligent conversion layer can be applied to a software conversion process, in addition to a literal translation layer. The intelligent conversion layer can include contextual recognition and reconstruction. The contextual recognition and reconstruction can be achieved, for example, by analyzing source code written in a first language, determining an objective of the analyzed source code, and generating source code written in a second language that achieves the determined objective. The contextual recognition and reconstruction can include device selection, interrupt and macro support, and peripheral support. The contextual recognition and context reconstruction can utilize a data source. According to the embodiment, the intelligent conversion layer can allow a user to customize the contextual recognition and reconstruction of the source code, and can include optimization of the resulting source code. In one embodiment of the invention, the source code can include assembly language source code.

Figure 1:
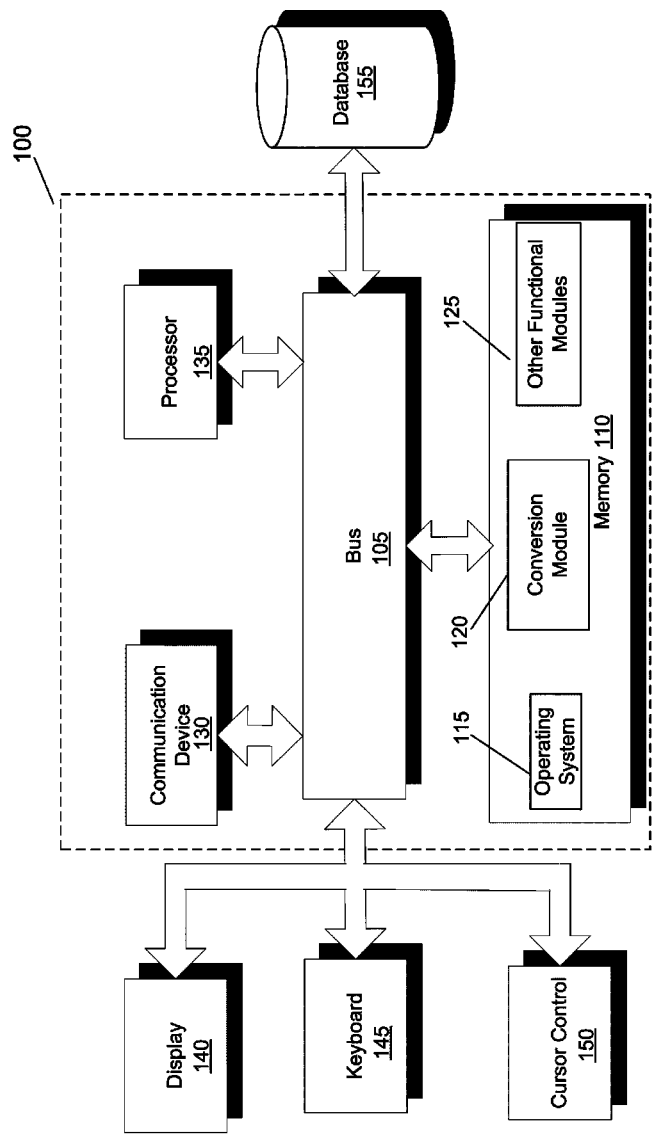
FIG. 1 illustrates a block diagram of an apparatus according to an embodiment of the invention.

FIG. 1 illustrates a block diagram of an apparatus according to an embodiment of the invention. Specifically, FIG. 1 illustrates apparatus 100. Apparatus 100 includes a bus 105 or other communications mechanism configured to communicate information between components of apparatus 100. Apparatus 100 also includes a processor 135, operatively coupled to bus 105, configured to process information and executing instructions or operations. Processor 135 may be any type of general or specific purpose processor. Apparatus 100 further includes a memory 110 configured to store information and instructions to be executed by processor 135. Memory 110 can include any combination of random access memory (RAM), read only memory (ROM), static storage such as a magnetic or optical disk, or any other type of machine or computer readable medium. Apparatus 100 further includes a communication device 130, such as a network interface card or other communications interface, configured to provide access to a network. As a result, a user may interface with apparatus 100 directly, or remotely through a network or any other method.

A computer readable medium may be any available medium that can be accessed by processor 135. Computer readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium known in the art.

Processor 135 can also be operatively coupled via bus 105 to a display 140, such as a Liquid Crystal Display (LCD). Display 140 can display information to the user. A keyboard 145 and a cursor control device 150, such as a computer mouse, can also be operatively coupled to bus 105 to enable the user to interface with apparatus 100.

According to one embodiment, memory 110 can store software modules that may provide functionality when executed by processor 135. The modules can include an operating system 115, a converter module 120, as well as other functional modules 125. Operating system 115 can provide an operating system functionality for apparatus 100. Converter module 120 can provide functionality for converting source code from a first language to a second language, as will be described in more detail below. Apparatus 100 can also be part of a larger system. Thus, apparatus 100 can include one or more additional functional modules 125 to include additional functionality for the system.

Processor 135 can also be operatively coupled via bus 105 to a database 155. Database 155 can store data in an integrated collection of logically-related records or files. Database 155 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
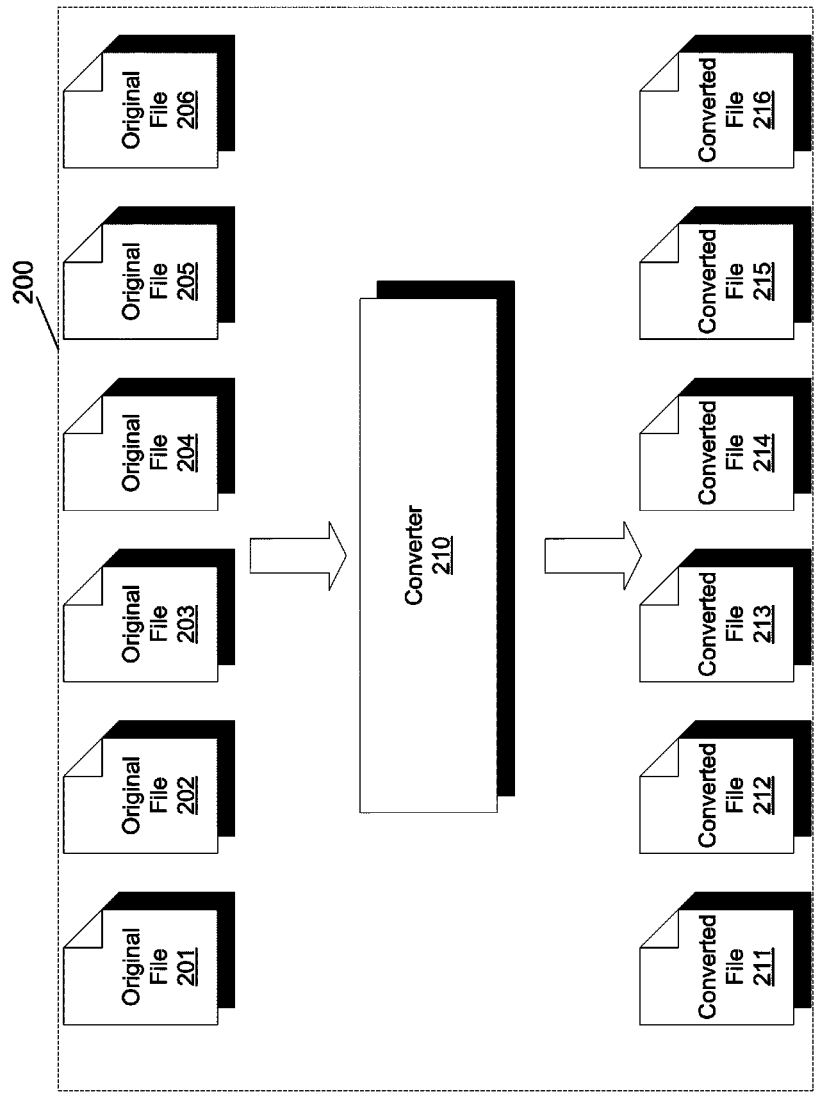
FIG. 2 illustrates an example of source code conversion according to an embodiment of the invention.

FIG. 2 illustrates an example of source code conversion according to an embodiment of the invention. The illustrated embodiment includes a workspace 200. Workspace 200 is an example of a workspace, which, as understood by one of ordinary skill in the art, can be a computer file or directory that provides for a collection of source code files and resources, where the source code files and resources can be implemented as a cohesive unit.

The illustrated embodiment also includes original files 201, 202, 203, 204, 205, and 206. Original files 201, 202, 203, 204, 205, and 206 represent source code files that, combined with resources, can be implemented as a cohesive unit. A source code file is a computer file that includes a collection of instructions written in a human-readable computer programming language. Thus, according to the embodiment, original files 201, 202, 203, 204, 205, and 206 can each contain a collection of instructions written in an original language. In one embodiment of the invention, original files 201, 202, 203, 204, 205, and 206 are assembly language source code files, where each assembly language source code file includes a collection of instructions written in an assembly language.

The illustrated embodiment also includes converter 210. Converter 210 is a software module that can be run on a processor (not shown), where the processor can execute the instructions of converter 210. In an embodiment of the invention, converter 210 corresponds to converter module 120 of FIG. 1. Furthermore, in an embodiment of the invention, converter 210 is a software module that is capable of running in an environment that includes a Windows® operating system.

According to an embodiment of the invention, converter 210 can convert source code from an original file, such as original file 201, which is written in an first language, into source code written in a second language. The conversion can include three layers, a literal translation layer, an intelligent conversion layer, and an optimization layer, as will be discussed in more detail. Converter 210 can then create a new file, such as converted file 211, which includes the converted source code, written in the second language, as will be discussed in more detail. Converter 210 can perform this conversion once a user selects which original file to be converted, as will also be discussed in more detail.

In an embodiment of the invention where there are multiple original files, converter 210 can convert the multiple original files to multiple converted files in a serial manner. Converter 210 can perform this conversion once a user selects a set of multiple original files to be converted, or selects a directory that includes multiple original files. According to the embodiment, converter 210 can select a first original file, convert the original file to a converted file, save the converted file, and can repeat the previous steps for each original file, until converter 210 has created a converted file for each original file. As one of ordinary skill in the art would readily appreciate, converter 210 is not limited to the number of original files illustrated in FIG. 2, as the number of original files illustrated is FIG. 2 is merely an example embodiment. In alternative embodiments, converter 210 can convert any number of original files to converted files.

The illustrated embodiment also includes converted files 211, 212, 213, 214, 215, and 216. In the illustrated embodiment, as previously described, converter 210 creates a converted file for each of original files 201, 202, 203, 204, 205, and 206. Each of converted files 211, 212, 213, 214, 215, and 216 corresponds to original files 201, 202, 203, 204, 205, and 206, but each converted file includes source code written in a second language. In one embodiment of the invention, converted files 211, 212, 213, 214, 215, and 216 are assembly language source code files, where each assembly language source code file includes a collection of instructions that correspond to the collection of instructions in the corresponding original file, but are written in a new assembly language.

Figure 3:
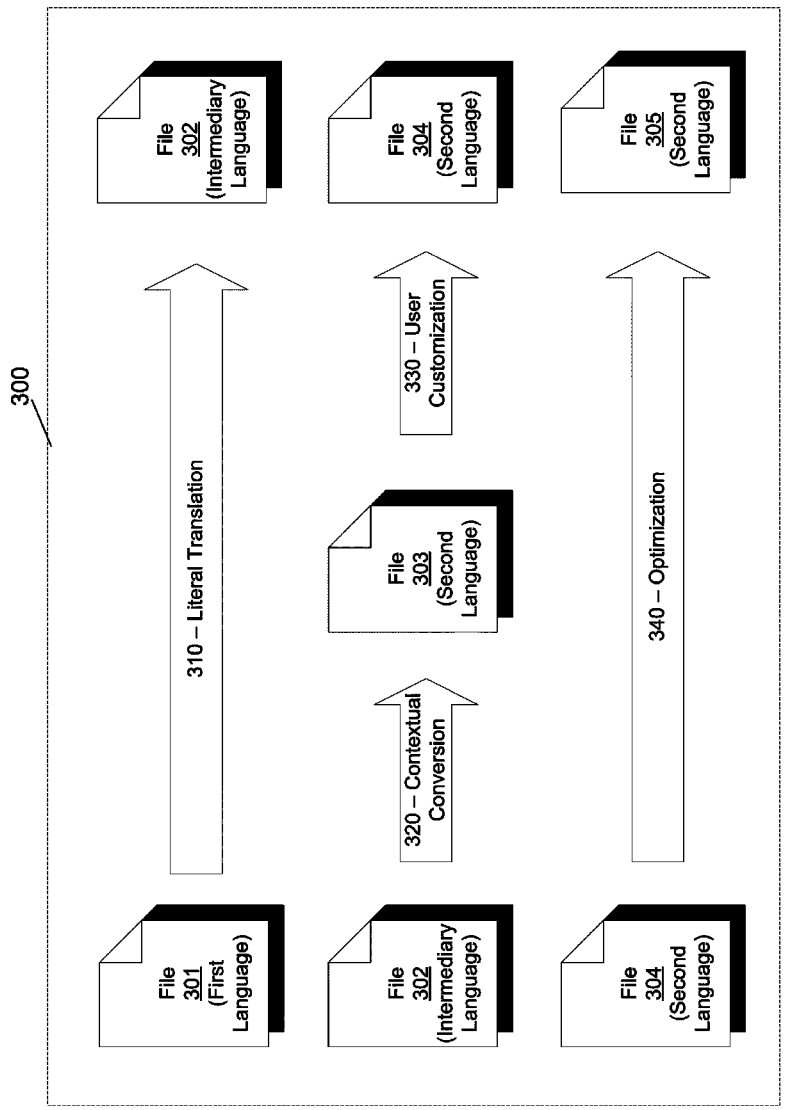
FIG. 3 illustrates a conversion flow according to an embodiment of the invention.

FIG. 3 illustrates a conversion flow according to an embodiment of the invention. The conversion flow is a flow for converting source code from an original file, which is written in an first language, into source code written in a second language, and saving the converted source code into a new file. In an embodiment of the invention, the conversion flow can be performed by converter module 120 of FIG. 1 when run on a processor. In another embodiment of the invention, the conversion flow can be performed by converter 210 of FIG. 2 when run on a processor. The illustrated embodiment includes a workspace 300. Similar to workspace 200 of FIG. 2, workspace 300 can be a file or directory that provides for a collection of source code files and resources, where the source code files and resources can be implemented as a cohesive unit.

The illustrated embodiment includes file 301. File 301 represents a source code file written in a first language. In certain embodiments of the invention, the first language is an assembly language. According to one embodiment of the invention, file 301 is an assembly language source code file written for a Programmable Interface Controller (PIC) microcontroller. As one of ordinary skill in the art would appreciate, a PIC microcontroller is one of a family of Harvard architecture microcontrollers. However, this is merely an example embodiment of the invention, and file 301 may include assembly language source code for any type of hardware, or may include source code written in any programming language.

According to an embodiment of the invention, the conversion flow can include four steps, steps 310, 320, 330, and 340. At step 310, the source code of file 301, which is written in a first language, is literally translated into an intermediary language, file 302 is generated, and the translated source code is stored in file 302. As previously described, literal translation includes analyzing each instruction of the source code of file 301 written in a first language, converting the instruction written in the first language to an instruction written in an intermediary language, and storing the translated instruction in file 302. This literal translation constitutes a first layer of the conversion process, a literal translation layer.

For example, in an embodiment where file 301 is an assembly language source code file written for a PIC microcontroller, it can be recognized during analysis of the source code of file 301 that an instruction is a PIC assembly language instruction for an addition operation. The PIC addition instruction is translated into an addition instruction written in the intermediary language, and stored in file 302. Thus, in the embodiment of the invention, there is a one-to-one relationship of instructions between file 301 and file 302.

File 302 represents a source code file written in an intermediary language. In an embodiment of the invention, the intermediary language is a pseudo assembly language. Pseudo assembly language is a compact and informal high-level description of an assembly language that uses the structural conventions of a particular assembly language, but does not necessarily fully comply with the syntax requirements of the particular assembly language. Therefore, source code written in the pseudo assembly language is not meant to be executed. However, this is merely an example embodiment of the invention, and file 302 may include assembly language source code for any type of hardware, or may include source code written in any programming language.

At step 320, the source code of file 302, which is written in the intermediary language, is contextually converted into a second language, file 303 is generated, and the converted source code is stored in file 303. As will be described in more detail in relation to FIG. 4, contextual conversion includes contextual recognition and reconstruction. This entails analyzing the source code written in the intermediary language to recognize context, and reconstructing the recognized context in the source code written in the second language. As will also be described in more detail in relation to FIG. 4, contextual conversion can include the utilization of a data source.

File 303 represents a source code file written in a second language. In certain embodiments of the invention, the second language is an assembly language. According to one embodiment of the invention, file 303 is an assembly language source code file written for an R8C microcontroller. As one of ordinary skill in the art would appreciate, an R8C microcontroller is one of a family of 16-bit microcontrollers with a 16-bit arithmetic logic unit (ALU). However, this is merely an example embodiment of the invention, and file 303 may include assembly language source code for any type of hardware, or may include source code written in any programming language.

At step 330, the source code of file 303, which is written in the second language, is customized by a user, file 304 is generated, and the customized source code is stored in file 304. As will be described in more detail in relation to FIG. 5, user customization allows the user to customize the source code created by the contextual conversion process of step 320. Through user customization, the user can affirm or override conversion decisions made in the contextual conversion process, and can make additional conversion decisions to further contextually convert the source code.

File 304 represents a source code file written in a second language. In certain embodiments of the invention, the second language is an assembly language. The language of file 304 is the same as the language of file 303, but file 304 includes any user customization of the source code.

At step 340, the source code of file 304, which is written in the second language is optimized, file 305 is generated, and the optimized source code is stored in file 305. As will be described in more detail in relation to FIG. 6, optimization allows for the optimization of the source code created by the user customization process of step 330. Optimization can include refining the source code to utilize features of the second language. This optimization can result in reducing the size and complexity of the source code.

File 305 represents a source code file written in a second language. In certain embodiments of the invention, the second language is an assembly language. The language of file 305 is the same as the language of file 304, but file 305 includes any optimization of the source code. In the illustrated embodiment of the invention, file 305 is the end product of the conversion flow, and file 305 is saved in workspace 300 as an output file of the conversion flow.

According to an alternative embodiment of the invention, step 340 can be omitted, and the conversion flow only includes steps 310, 320, and 330. In this alternative embodiment, file 304 is the end product of the conversion flow, and file 304 is saved in workspace 300 as an output file of the conversion flow. Together, steps 310, 320, and 330 in the illustrated embodiment of the invention, (or steps 310 and 320 in the alternative embodiment of the invention) constitute a second layer of the conversion process, an intelligent conversion layer. Whether step 340 is omitted can be determined by a user according to an embodiment of the invention. For example, a user can set a flag that contains a setting value which determines whether step 340 is performed or omitted.

Figure 4:
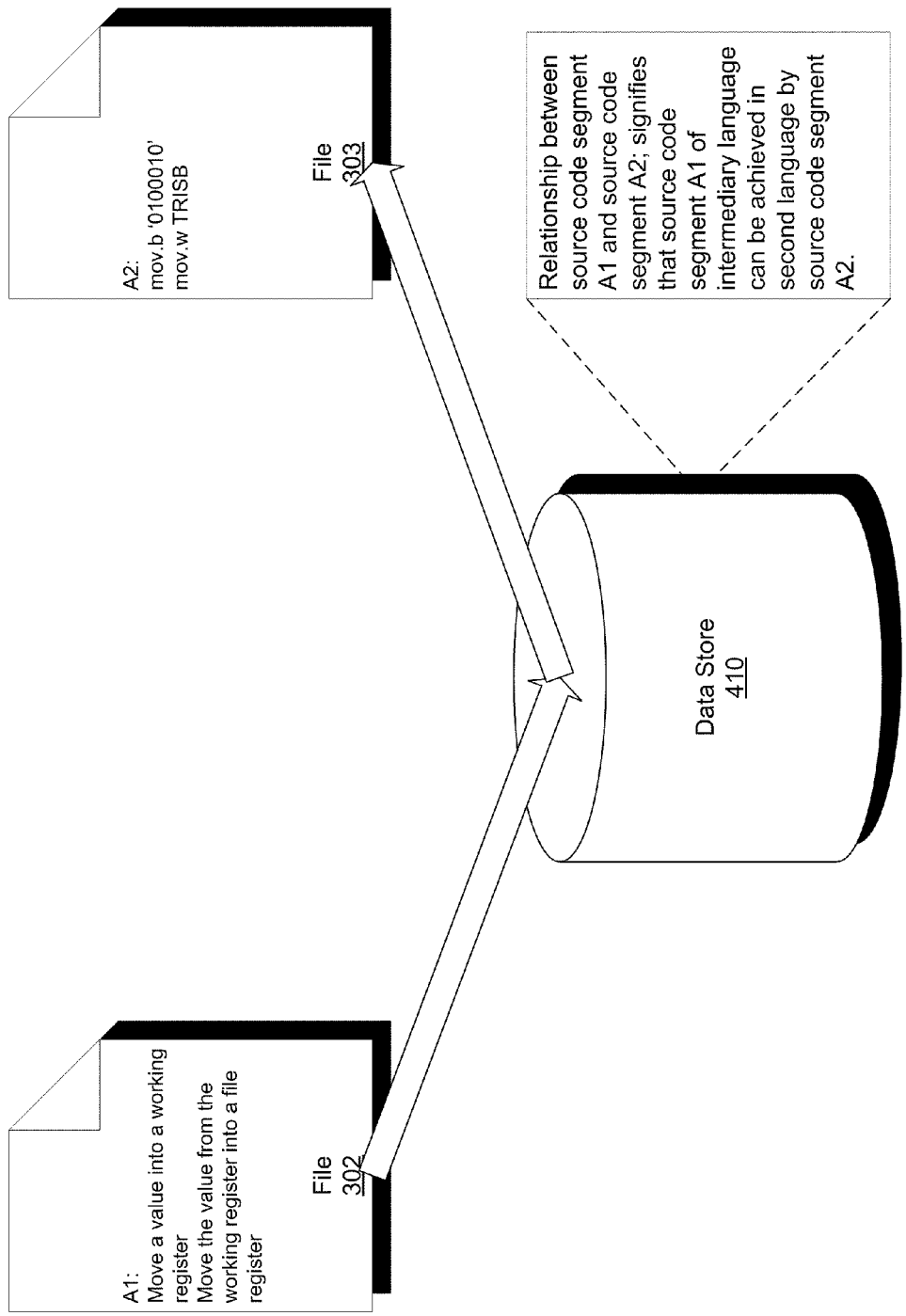
FIG. 4 illustrates an example of contextual recognition and reconstruction according to an embodiment of the invention.

FIG. 4 illustrates an example of contextual recognition and reconstruction according to an embodiment of the invention. In an embodiment of the invention, contextual recognition and reconstruction can be performed by converter module 120 of FIG. 1. In another embodiment of the invention, contextual recognition and reconstruction can be performed by converter 210 of FIG. 2. While the illustrated embodiment, which will be described in more detail, involves an analysis of source code written in an intermediary language, in certain embodiments of the invention, the source code written in a first language can be analyzed instead of the source code written in an intermediary language.

The illustrated embodiment includes file 302. As previously described, file 302 represents a source code file written in an intermediary language, which is the result of a literal translation process being applied to a source code file written in a first language. According to the embodiment, source code of file 302 is analyzed to recognize context of the instructions contained within the source code. For example, in the illustrated embodiment, file 302 includes a segment of source code identified as source code segment A1. It is recognized that source code segment A1 moves a value into a working register, and moves the value from the working register into a file register. One of ordinary skill in the art would readily appreciate that the representation of A1 in FIG. 4 is for the purpose of describing the invention, and that the source code represented by A1 can take the form of any assembly language, programming language, or pseudo language.

The illustrated embodiment also includes data store 410. Once it is recognized that source code segment A1 of file 302 moves a value into a working register, and moves the value from the working register into a file register, a look up of data store 410 is performed to determine whether data store 410 contains a source code segment written in a second language that achieves the same objective as source code segment A1 (i.e., moving a value into a working register, and moving the value from the working register into a file register). In the illustrated embodiment, it is determined that data store 410 does contain a source code segment written in a second language that achieves the same objective as source code segment A1. This source code segment written in a second language is identified in FIG. 4 as source code segment A2. In the illustrated embodiment, source code segment A2 represents assembly language source code written for an R8C microcontroller. However, one of ordinary skill in the art would readily appreciate that this is merely an example embodiment of the invention, and that source code segment A2 can represent assembly language source code for any type of hardware, or source code written in any programming language. A software module performing contextual recognition and reconstruction, such as converter module 120 of FIG. 1 and converter 210 of FIG. 2, can connect to data store 410 upon initiation of the software module, and can also connect periodically during the operation of the software module. Data store 410 can be populated with source code segment relationship pairs, where each source code segment of a first language is paired up with a corresponding source code segment of a second language that achieves the same object as the source code segment of the first language. Data store 410 can be populated before initiation of the software module, and can be populated periodically during the operation of the software module.

According to the embodiment of the invention, once it is determined that source code segment A2 of data store 410 achieves the same objective as source code segment A1, source code segment A2 is written to file 403. As previously described, file 303 represents a source code file written in a second language. The contextual recognition and reconstruction is repeated for each source code segment of file 302, until file 303 includes the entire source code of file 302, where the source code has been converted from the intermediary language into the second language.

According to the embodiment, a feature of the contextual recognition and reconstruction process is that an association between a source code segment written in the intermediary language (e.g., source code segment A1) and a source code segment written in the second language (e.g., source code segment A2) can be made even though each source code segment may include different instructions for achieving an objective. For example, source code segment A1 may include an single instruction to initialize a single register as an enable bit, because only a single register needs to be initialized in order to achieve the objective of source code segment A1. However, source code segment A2 may need to include two instructions, a first instruction to initialize a first register as a first enable bit, and a second instruction to initialize a second register as a second enable bit. This second instruction may be necessary, because, in the second language, two registers need to be initialized as enable bits, rather than a single register. Because source code segment A1 is associated with source code segment A2 in data store 410 according to context, rather than literal translation, it can be recognized that the resulting source code in file 303 must initialize a second register in addition to initializing a first register. Thus, source code segment A1 is replaced with source code segment A2, and the correct source code is written to file 303.

As another example, source code segment A1 may include a single instruction to initialize a single register as an enable bit, because only a single register needs to be initialized in order to achieve the objective in the first language, and thus in the intermediary language as well. In contrast, source code segment A2 may also include a single instruction to initialize a single register as an enable bit, but the instruction initializes a different register in a different location. Because source code segment A1 is associated with source code segment A2 in data store 410 according to context, rather than literal translation, it can be recognized that the resulting source code in file 303 must initialize the register in a different location than source code segment A1. Thus, source code segment A1 is replaced with source code segment A2, and the correct source code is written to file 303.

These refinement examples are merely examples of the contextual recognition and reconstruction process, and do not limit the contextual recognition and reconstruction process in any way. As one of ordinary skill in the art would appreciate, other refinement examples can exist where the source code written in the intermediary language is analyzed to recognize context, and the source code written in the second language is reconstructed using the recognized context. Because contextual recognition and reconstruction can provide refinement of the source code that literal translation cannot, contextual recognition and reconstruction has more depth and nuance than literal translation. Thus, contextual recognition and reconstruction moves away from a strict line-by-line (or segment-by-segment) translation, and considers a context of a source code segment in order to determine the corresponding source code segment to generate.

Data store 410 can be any type of data structure known in the art. For example, in an embodiment of the invention, data store 410 can be a lookup table. Data store 410 can also be any type of database. For example, in certain embodiments of the invention, data store 410 can be an operational database, an analytical database, a data warehouse, a distributed database, an end-user database, an external database, a navigational database, an in-memory database, a document-oriented database, a real-time database, a relational database, an object-oriented database, or any other database known in the art. Data store 410 can also be any type of computer file known in the art.

According to an embodiment of the invention data store 410 can be populated with entries based on known programming languages. For example, in an embodiment of the invention, data store 410 can be populated with entries based on known assembly languages for a PIC microcontroller family and for a R8C microcontroller family.

According to an embodiment of the invention, data store 410 can be populated with information for each device of a R8C microcontroller family. The information can include ROM and RAM size information, RAM location information (especially outside of a debug area), interrupt vector information, processor clock information, and peripheral information. According to an embodiment of the invention, a user can select a device of a PIC microcontroller family, and, as part of the contextual recognition and reconstruction process, a cross-reference device of a R8C microcontroller family can be recommended to a user that most closely matches the selected device of the PIC microcontroller family, based on the information stored in data store 410. In the embodiment, if a user selects the recommended R8C microcontroller device, source code related to the recommended R8C microcontroller device can be used during the contextual recognition and reconstruction process. However, if a user rejects the recommended R8C microcontroller device and selects an alternate R8C microcontroller device, source code related to the alternate R8C microcontroller device can be used during the contextual recognition and reconstruction process.

Further examples of contextual recognition and reconstruction are described. These examples relate to interrupt support, macro support, peripheral support, and bit manipulation. However, one of ordinary skill in the art would appreciate that these are merely examples of contextual recognition and reconstruction, and do not limit the contextual recognition and reconstruction process to these example embodiments.

In an embodiment of the invention, the contextual recognition and reconstruction process can include analyzing source code of file 302 written in an intermediary language and determining which interrupt flags, or interrupt sources, are being polled within an interrupt routine. In computer systems, an interrupt can be an asynchronous signal indicating a need for attention, or a synchronous event indicating a need for change in execution of a software application. The interrupt vector information populated in data store 410 can be queried to generate source code written in a second language for each of the interrupt sources at an appropriate location, and the generated source code can be written to file 303 in the appropriate place.

In an example of interrupt support according to an embodiment of the invention, where source code of file 302 written in an intermediary language was literally translated from source code written for a PIC microcontroller, the source code of file 302 can be analyzed to identify the PIC microcontroller's INTCON, PIR, and PIE registers and to determine which interrupt flags are configured. An INTCON register is a readable and writable register which contains enable, priority, and flag bits for all interrupt sources. A PIR register contains individual flag bits for peripheral interrupts. A PIE register contains individual enable bits for peripheral interrupts. A PIC microcontroller utilizes a global interrupt vector. However, certain microcontrollers, such as a R8C microcontroller, utilize individual interrupt service routines (ISRs). Therefore, according to the embodiment, the contextual recognition and reconstruction process can include identifying source code segments of file 302 that include a conditional statement that checks the status of a specific bit, such as an interrupt request (IRQ) flag, in the PIC microcontroller's registers described above, generates a source code segment that utilizes individual ISR routines, and writes the generated source segment to file 303.

According to the embodiment of the invention, the contextual recognition and reconstruction process can also include analyzing source code of file 302 written in an intermediary language and identifying macros labels. A macro label is an abbreviated format that represents a set of instructions. When source code written in a second language is generated, each macro label can be replaced with the expanded source code written in the second language, and the expanded source code is included in the source code written to file 303.

According to an embodiment of the invention, the contextual recognition and reconstruction process can further include analyzing source code of file 302 written in an intermediary language and identifying source code related to a specific peripheral, such as a write instruction. A peripheral is a device that is part of, or attached to, a micro controller. Examples of peripherals include timers (such as capture compare timers, and pulse width modulation (PWM) timers), analog-to-digital converters (ADCs), serial peripherals (such as universal asynchronous receivers/transmitters (UARTs), universal synchronous/asynchronous receivers/transmitters (USARTs) and serial programmable interfaces (SPIs)), input/output (I/O) devices, and buses (such as controller-area network (CAN) buses, and local interconnect network (LIN) buses). Once source code related to a specific peripheral for the intermediary language is identified, settings for the specific peripheral for the second language are identified, and appropriate source code written in a second language is generated, and is included in the source code written to file 303. According to an embodiment of the invention, a search function can be used to identify setting for the specific peripheral for the second language.

In addition, according to the embodiment of the invention, the contextual recognition and reconstruction process can further include analyzing source code of file 302 written in an intermediary language and identifying bit or byte manipulation. A bit or byte may represent one value in the intermediary language, but that same bit or byte may presents a completely different value in the second language. For example, with respect to data direction bits, a value 0 in certain languages makes a pin an output pin, where in other languages the value 0 makes the pin an input pin. Once source code related to bit manipulation or byte manipulated for the intermediary language is identified, if necessary, the status of each bit or byte being manipulated is altered in the generated source code written in a second language, and the generated source code is written to file 303.

Figure 5:
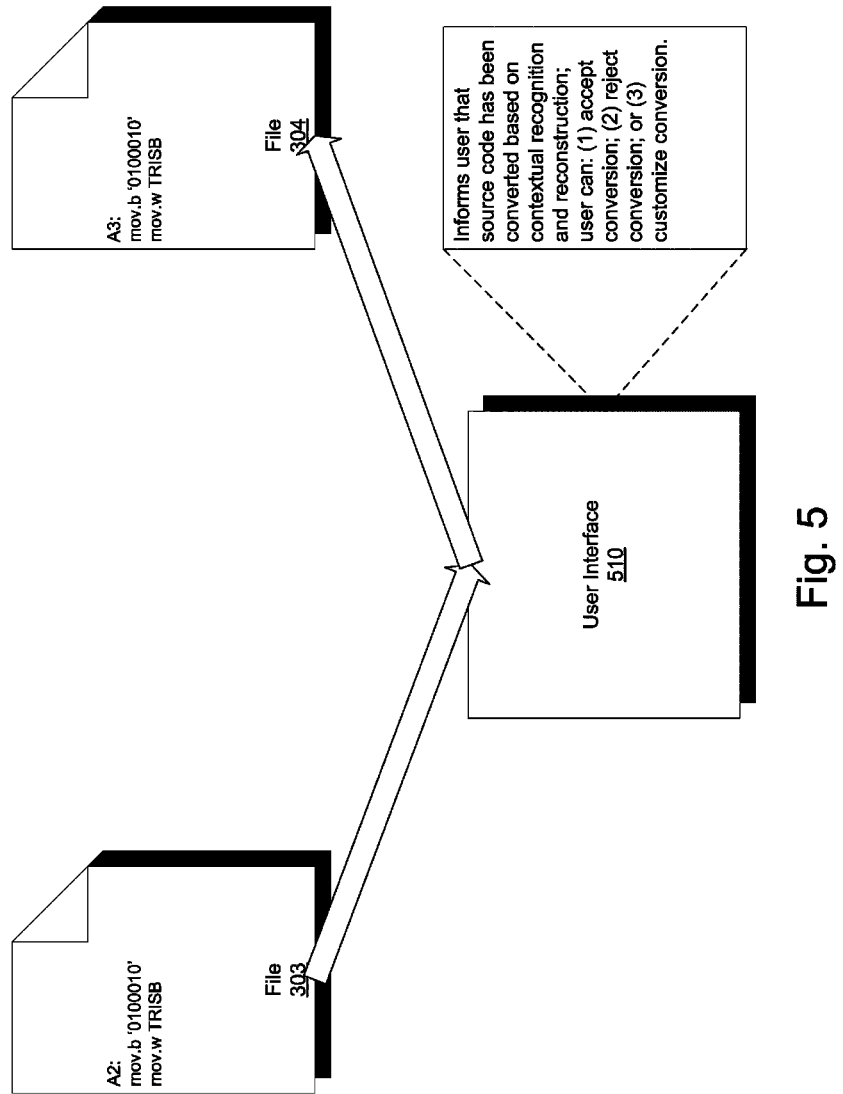
FIG. 5 illustrates an example of user customization according to an embodiment of the invention.

FIG. 5 illustrates an example of user customization according to an embodiment of the invention. In an embodiment of the invention, user customization can be performed by converter module 120 of FIG. 1. In another embodiment of the invention, user customization can be performed by converter 210 of FIG. 2.

The illustrated embodiment includes file 303. As previously described, file 303 represents a source code file written in a second language, which is the result of a contextual recognition and reconstruction process as previously described in FIG. 4. According to the embodiment, for each source code segment of file 303 that was reconstructed from an original source code segment of file 302, as a result of the contextual recognition and reconstruction process described in FIG. 4, a user interface is displayed which describes the changes to the source code, and requests the user to confirm the changes, reject the changes, or customize the changes. In the illustrated embodiment, source code segment A2 represents a source segment of file 303 that was reconstructed from an original source code segment of file 302, and user interface 510 represents the user interface that is displayed. Furthermore, in the illustrated embodiment, source code segment A2 represents assembly language source code written for an R8C microcontroller. However, one of ordinary skill in the art would readily appreciate that this is merely an example embodiment of the invention, and that source code segment A2 can represent assembly language source code for any type of hardware, or source code written in any programming language.

According to the illustrated embodiment, user interface 510 is displayed to a user, and describes the changes made to the source code in source code segment A2. As an example, if the changes made to the source code relate to a peripheral, then user interface 510 displays the new peripheral settings.

According to the illustrated embodiment, user interface 510 allows a user to: (1) accept the changes made to the source code; (2) reject the changes made to the source code; or (3) further customize the changes made to the source code. In the illustrated embodiment, user interface 510 can display three buttons that a user can select. The first button accepts the changes made to the source code. The second button rejects the changes made to the source code. The third button allows the user to further customize the changes made to the source code using the user interface.

Once the user finishes customizing the changes made to the source code, new source code is generated and written to file 304. If the user accepts all changes made to the source code, than file 304 is identical to file 304. However, if the user rejects or customizes any changes, than file 304 includes the user's changes to the source code. In the illustrated embodiment, the user accepts source code segment A2. Thus, the resulting source code segment that is generated, represented in FIG. 5 as source code segment A3 is identical to source code segment A2, and source code segment A3 is written to file 304. As previously described, file 304 represents a source code file written in a second language. In certain embodiments of the invention, the second language is an assembly language. The language of file 304 is the same as the language of file 303, but file 304 includes any user customization of the source code.

According to an embodiment of the invention, a user can select a device of a PIC microcontroller family, and the changes made to the source code that are displayed to the user in user interface 510 are based on a cross-reference device of a R8C microcontroller family that most closely matches the selected device of the PIC microcontroller family. In the embodiment, the user can accept the changes made to the source code, reject the changes, or further customize the changes. One manner of customizing the changes is to select a different device of the R8C microcontroller family.

User interface 510 can by any kind of graphical user interface known in the art that can allow a user to interact with a converter module. User interface 510 can allow a physical input device, such as a mouse or a keyboard, to control the position of a cursor, and can display information organized in windows and represented with icons on a visual peripheral, such as a monitor, display, or LCD.

Figure 6:
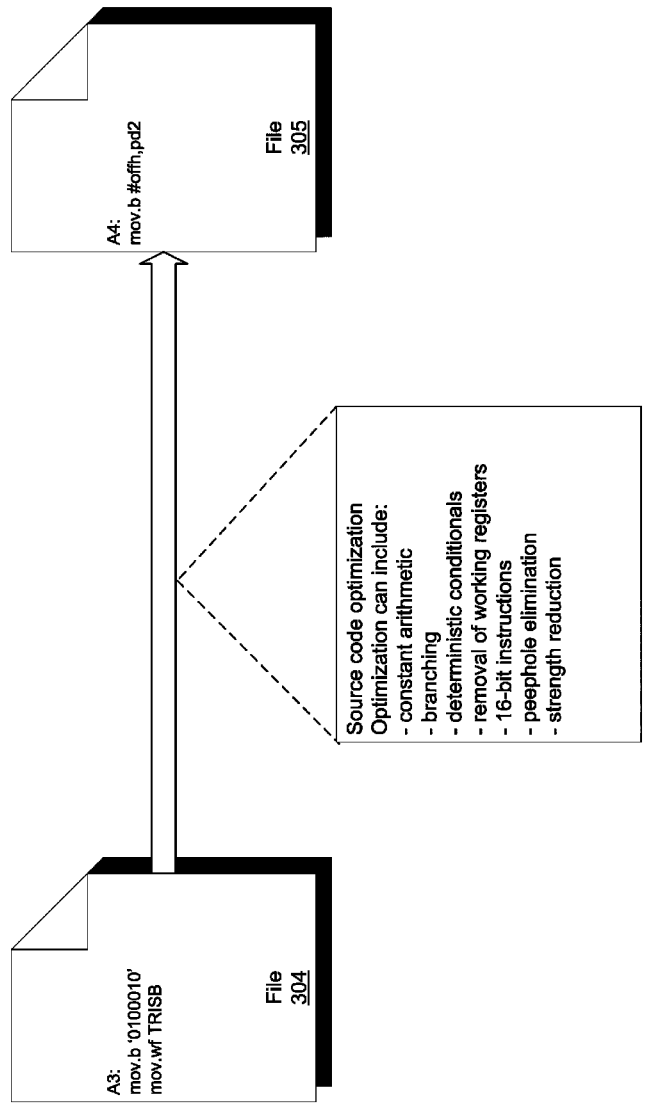
FIG. 6 illustrates an example of optimization according to an embodiment of the invention.

FIG. 6 illustrates an example of optimization according to an embodiment of the invention. In an embodiment of the invention, optimization can be performed by converter module 120 of FIG. 1. In another embodiment of the invention, optimization can be performed by converter 210 of FIG. 2.

The illustrated embodiment includes file 304. As previously described, file 304 represents a source code file written in a second language, which is the result of a contextual recognition and reconstruction process being applied to a source code file written in an intermediary language, and a subsequent user customization process being applied to a resulting source code file written in the second language.

According to the embodiment, the source code of file 304, which is written in the second language is optimized. This means that an efficiency of the source code is improved. For example, the source code may be optimized so that it executes more rapidly, operates with less memory storage or other resources, or utilizes features specific to the second language.

Further examples of optimization are described. These examples relate to constant arithmetic, branching, deterministic conditionals, removal of working registers, 16-bit instructions, peephole elimination, and strength reduction. However, one of ordinary skill in the art would appreciate that these are merely examples of optimization, and do not limit the optimization process to these example embodiments.

A first type of customization is constant arithmetic optimization. A microcontroller's ALU can rely heavily on an 8-bit working register, when the register is written to and read from numerous time through the course of a sub-function or algorithm with constant data. For example, source code of file 304 may contain the following instructions:

```
movlw b'01000010'
addlw b'10001000'
sublw b'00011000'
```

In these example instructions, a constant binary value, 01000010 (66 in decimal), is moved into the working register. The constant binary value is then added to another constant binary value, 10001000 (132 in decimal), and the resulting binary value moved into the working register. Another constant binary value, 00011000 (24 in decimal), is subtracted from the resulting binary value from the working register, and the new resulting binary value is moved into the working register. According to the embodiment, the source code can be optimized by analyzing the multiple operations being performed that relate to the working register and replacing the multiple operations with a single comprehensive operation. In the above example, the source code of file 304 described above can be optimized into the resulting source code which simply performs the comprehensive operation:

mov.b #B2h

There are many different combinations of constant arithmetic optimization which can be utilized according to embodiments of the invention. For example, a constant binary value can be moved into a working register, then added to two other binary values, and then moved back into the working register. As another example, the constant binary value can be multiplied with three other binary values, and then moved back into the working register. One of ordinary skill in the art would readily appreciated that the described examples are listed to better illustrate the invention, and do not limit the scope of the embodiment to merely the described examples of constant arithmetic optimization.

A second type of optimization is branching optimization. In branch optimization, sub-routines of the source code of file 304 can be traversed, branching of the sub-routines can be analyzed, and more efficient sequences of branch instructions can be determined which increase the efficiency of the control flow. Thus, after branch optimization, the resulting source code can include new branch instructions which replace the earlier branch instructions, and the resulting code can utilize a more efficient control flow. As an example of increasing the efficiency of a control flow, structured branch constructs are considered more efficient than unstructured branch constructs. A structured branch construct is a branch construct that follows a hierarchical design (such as a IF ... THEN ... ELSE statement or a WHILE statement, or a FOR statement). A unstructured branch construct is a branch construct that does not follow a hierarchical design, and instead jumps from one section of a program to another section in a random fashion. Thus, according to the embodiment of the invention, unstructured branch constructs can be replaced with structured branch constructs to increase efficiency of the control flow. In an embodiment of the invention, where the second language is a language for an R8C microcontroller the branching optimization can utilize advanced R8C jump mnemonics, such as Add and Jump If Not Zero (ADJNZ), Subtract and Jump If Not Zero (SBJNZ), and Jump on Condition (JCND).

A third type of optimization is deterministic conditional optimization. Source code, especially source code that utilizes branching, can include one or more source code segments that cannot possibly be executed. These source code segments are identified as unreachable source code. According to the embodiment, source code of file 304 can be parsed and analyzed to identify unreachable source code, where the unreachable source code is eliminated. Thus, after deterministic conditional optimization, the resulting source code does not include any source code that can never be executed.

A fourth type of optimization relates to removal of working registers (also identified as temporary registrations). Source code can include an instruction to first move a value into a working register. Later on, the source code can include a second instruction to move that same value from the working register to another location, such as a file register. Because it is more efficiently to simply write the described value directly to the desired location, such as a file register, source code of file 304 can be analyzed to identify the usage of a working register, according to an embodiment of the invention. If a working register is identified, the multiple instructions in the source code of file 304 can be merged into a single instruction that writes the described value directly into the desired location.

For example, source code of file 304 may include the following source code, as illustrated in FIG. 6:

```
movlw b'11110000'
movwf TRISB
```

As one of ordinary skill would readily appreciate, while the illustrated embodiment of FIG. 6 illustrates optimization in relation to removal of working registers, FIG. 6 is an example embodiment of code optimization, and does not limit code optimization to any particular type of optimization. According to the embodiment, in the above example, the resulting optimized source code simply writes the desired value directly into the a memory mapped address in the microcontroller:

mov.b #offh,pd2

A fifth type of optimization relates to 16-bit instructions. A microcontroller generally includes, among other components, a central processing unit (CPU). A CPU can use a specific number of bits to represent an integer, a memory address, or some other data unit, such as 8 bits or 16 bits. A microcontroller with a CPU that uses 8 bits to represent an integer, a memory address, or some other data unit, is identified as an 8-bit microcontroller. Likewise, a CPU that uses 16 bits to represent an integer, a memory address, or some other data unit, is identified as a 16-bit microcontroller.

Generally an 8-bit microcontroller can perform 8-bit operations, and a 16-bit microcontroller can perform 8-bit operations or 16-bit operations. For an 8-bit microcontroller to perform 16-bit operations, the 16-bit operations must be written in the form of a macro. A macro is a collection of instructions associated with a short name. During the processing of the source code, the short name is replaced with the associated collection of instructions, thus expanding the code.

Source code of file 304 can include macros for performing 16-bit operations. The source code may include macros because the first language of the source code was for an 8-bit microcontroller, such as a PIC microcontroller. For example, source code of file 304 can include the following macro:

```
; 16 bit move from SRC TO DST
MOV16 MACRO SRC, DST
MOVF SRC,W
MOVF SRC+1,W
MOVWF DST+1
ENDM
```

According to the embodiment, if the second language is for a 16-bit controller, such as a R8C microcontroller, then the source code of file 304 can be converted from pseudo 16-bit operations into actual 16-bit operations, thus collapsing the amount of source code. Because the source code is collapsed, the resulting optimized source code is generally smaller than the source code of file 304. According to the embodiment, in the above example, the resulting optimized source code is generated:

mov.w SRC,DST

A sixth type of optimization is peephole elimination. Peephole elimination refers to the removal of source code segments where a duplicate operation or a write to register is overwritten later without ever being used. Such source code segments can be safely removed from a computer program without affecting the functionality of the program. Thus, according to the embodiment, source code of file 304 can be analyzed to identify source code segments which includes unused operations or register writes. The resulting optimized source code does not include these unused operations or registers writes, and thus, is smaller and more streamlined than the source code of file 304.

A seventh type of optimization is strength reduction. Strength reduction refers to the replacement of operation with equivalent operations that utilize fewer CPU cycles. For example, a shift operation can be used to produce the same result as a divide operation, yet the shift operation takes fewer CPU cycles to complete as compared to the divide operation. Thus, according to the embodiment, source code of file 304 can be analyzed to identify source code segment which include operations that can be written using equivalent operations which utilize fewer CPU cycles. The resulting optimized source code, when executed, will generally utilize fewer CPU cycles than the source code of file 304.

These optimization examples are merely examples of the optimization process, and do not limit the optimization process in any way. As one of ordinary skill in the art would appreciate, other optimization examples can exist where the source code written in file 304 is analyzed to recognize an inefficiency inherent in the source code, and where the source code written in file 304 is optimized to remove the inefficiency. Such inefficiencies can include extraneous instructions, unnecessary use of resources, inefficient control flow, or failure to utilize features inherent in the second programming language.

Once the optimization is complete, new optimized source code is generated and written to file 305. As previously described, file 305 represents a source code file written in a second language. In certain embodiments of the invention, the second language is an assembly language. The language of file 305 is the same as the language of file 304, but file 305 includes any optimization of the source code.

Figure 7:
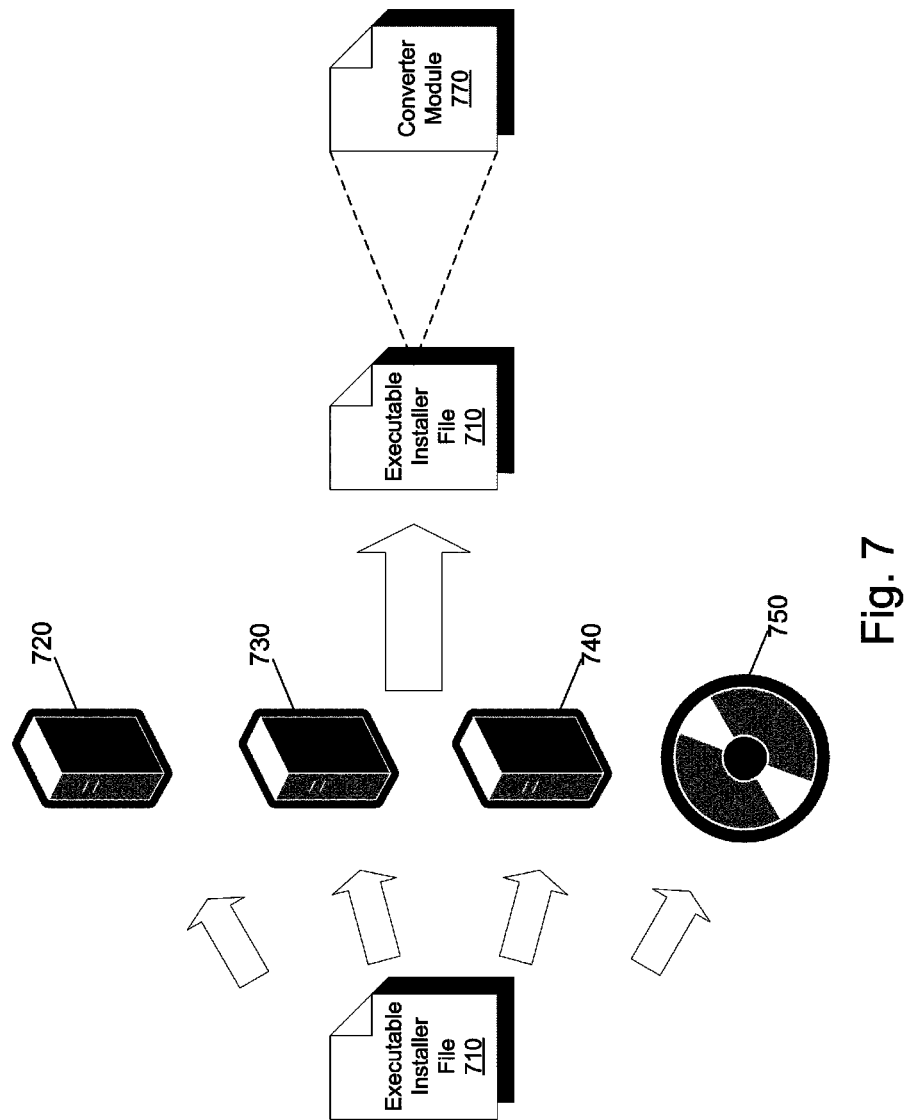
FIG. 7 illustrates a deployment of a converter module according to an embodiment of the invention.

FIG. 7 illustrates a deployment of a converter module according to an embodiment of the invention. The illustrated embodiment includes executable installer file 710. Executable installer file 710 is configured to install a software application which includes a converter module. In an embodiment of the invention, the converter module corresponds to converter module 120 of FIG. 1. In another embodiment of the invention, the converter module corresponds to converter 210 of FIG. 2.

Executable installer file 710 can be deployed to its target location in one of multiple deployment methods, as illustrated in FIG. 7. In one embodiment, executable installer file 710 can be deployed using file transfer protocol (FTP) server 720. In another embodiment, executable installer file 710 can be deployed using file server 730. In another embodiment, executable installer file 710 can be deployed using web server 740. In another embodiment, executable installer file 710 can deployed using compact disc 750.

Once executable installer file 710 is deployed in its target location, executable installer file 710, when run, can install a software application which includes converter module 770. During the operation of converter module 770, according to an embodiment of the invention, a user interface can be created which allows a user to select a file or files to be converted. Converter module 770 can then convert the file or files as previously described and produce a corresponding output file or output files. In an alternative embodiment of the invention, a command prompt can be created which allows a user to select a file or files to be converted. Convert module 770 can then convert the file or files as previously described and produce a corresponding output file or output files. In either embodiment, if a user selects a directory, than each file in the directory can be converted by convert module 770.

Figure 8:
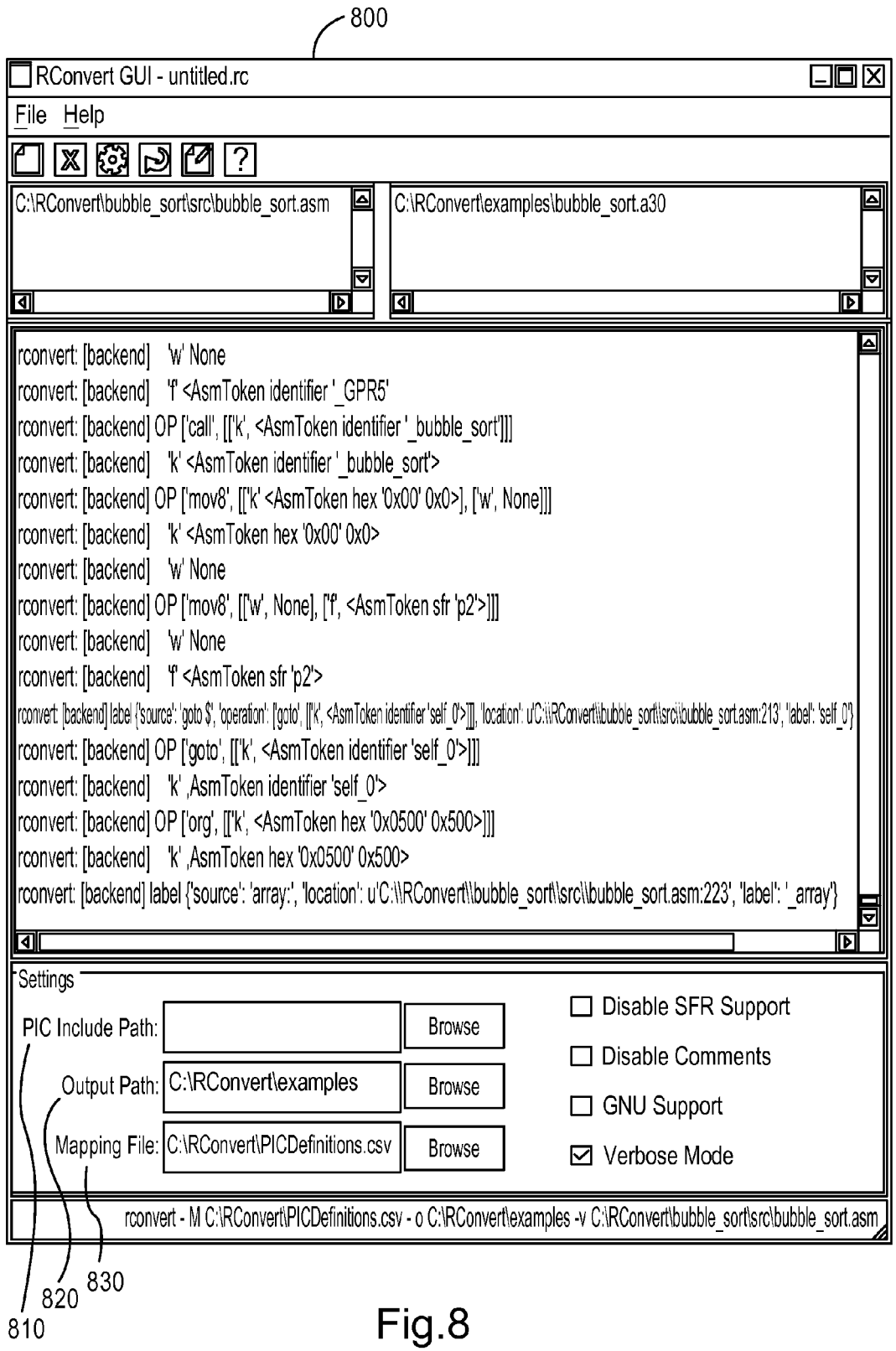
FIG. 8 illustrates a user interface of a converter module according to an embodiment of the invention.

FIG. 8 illustrates a user interface of a converter module according to an embodiment of the invention. The illustrated embodiment includes user interface 800. User interface 800 is an example of a user interface that can be created by converter module 770 of FIG. 7. According to the embodiment of the invention, user interface 800 can allow a user to select one or more files to be converted. User interface 800 can include input path 810. At input path 810, a user can specify a file, or a directory of files, that a user desires to be converted. User interface can also include output path 820. At output path 820, a user can specify a file, or a directory, where a user desires the converted file, or files, to be stored. User interface can also include mapping file 830. At mapping file 830, a user can specify a file, or a directory, that contains a data store that is to be used in the conversion process. As previously described, the data store can be any kind of data structure, database, or file, that is known in the art.

Figure 9:
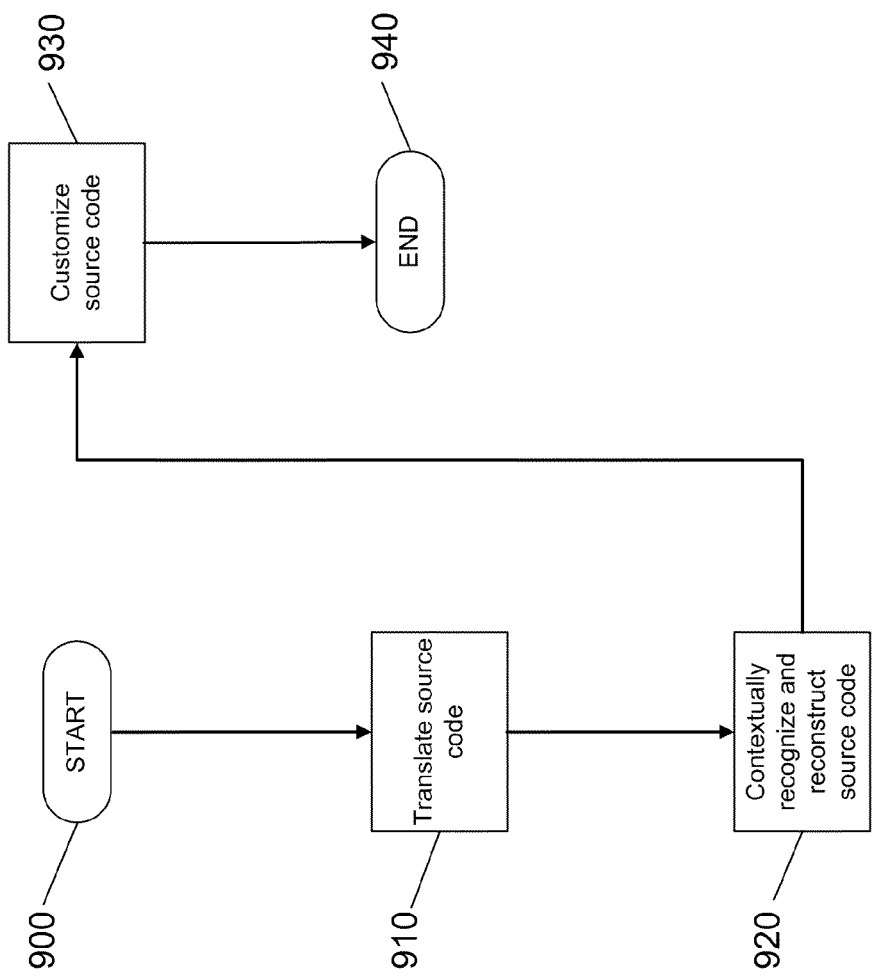
FIG. 9 illustrates a flow diagram according to an embodiment of the invention.

FIG. 9 illustrates a flow diagram according to an embodiment of the invention. The flow diagram starts at step 900, and at step 910, source code written in a first language from a first file is translated into source code written in an intermediary language. In an embodiment of the invention, the source code written in the intermediary language is stored in a first intermediary file. At step 920, the source code written in the intermediary language is contextually recognized and reconstructed into source code written in a second language. In an embodiment of the invention, the source code written in the second language is stored in a second intermediary file. In an alternate embodiment, the source code written in the first language is contextually recognized and reconstructed rather than the source code written in the intermediate language. At step 930, the source code written in the second language is customized by a user. In an embodiment of the invention, the customized source code written in the second language is stored in a second file. The flow diagram then completes at step 940.

FIG. 10 illustrates another flow diagram according to an embodiment of the invention. The flow diagram starts at step 1000, and at step 1010, source code written in a first language from a first file is translated into source code written in an intermediary language. In an embodiment of the invention, the source code written in the intermediary language is stored in a first intermediary file. At step 1020, the source code written in the intermediary language is contextually recognized and reconstructed into source code written in a second language. In an embodiment of the invention, the source code written in the second language is stored in a second intermediary file. In an alternate embodiment, the source code written in the first language is contextually recognized and reconstructed rather than the source code written in the intermediate language. At step 1030, the source code written in the second language is customized by a user. In an embodiment of the invention, the customized source code written in the second language is stored in a third intermediary file. At step 1040, the source code written in the second language is optimized. In an embodiment of the invention, the optimized source code written in a second language is stored in a second file. The flow diagram then completes at step 1050.

The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method implemented by a computer system, the method comprising:
   the computer system translating source code written in a first assembly language for implementation by a Programmable Interface Controller (PIC) microcontroller into source code written in a pseudo assembly language;
   wherein the translating comprises converting a set of sequential instructions of the source code written in the first assembly language to a set of sequential instructions, respectively, written in the pseudo assembly language;
   the computer system converting the source code written in the pseudo assembly language into source code written in a second assembly language for implementation by a non-PIC microcontroller;
   wherein the converting the source code written in the pseudo assembly language further comprises;
      identifying a first source code segment written in the pseudo assembly language that includes a conditional statement for checking a status of a bit in a register of the PIC microcontroller;
      generating a first source code segment written in the second assembly language that implements an interrupt service routine for the non-PIC microcontroller in response to the identifying.

2. The method of claim 1, further comprising:
   prompting a user to customize the conversion of the source code written in the pseudo assembly language into the source code written in the second assembly language;
   optimizing the source code written in the second assembly language.

3. The method of claim 1 wherein the converting the source code written in the pseudo assembly language further comprises:
   applying contextual recognition and reconstruction to the source code written in the pseudo assembly language to generate the source code written in the second assembly language,
   wherein the contextual recognition and reconstruction further comprises determining an objective of a segment of the source code written in the pseudo language;
   generating a segment of source code written in the second assembly language that achieves the objective of the segment of the source code written in the pseudo assembly language.

4. The method of claim 3, wherein the contextual recognition and reconstruction further comprises:
   looking up the source code segment of the source code written in the pseudo assembly language in a data store,
   determining whether the data store contains the source code segment written in the second assembly language that achieves the objective as the source code segment of the source code written in the pseudo assembly language, and
   replacing the source code segment of the source code written in the pseudo assembly language with the source code segment written in the second assembly language in the generated source code written in the second assembly language.

5. The method of claim 3, wherein the contextual recognition and reconstruction further comprises:
   identifying a macro label in the source code written in the pseudo assembly language;
   the method further comprising generating source code where the macro label is replaced with expanded source code written in the second assembly language.

6. The method of claim 3, wherein the contextual recognition and reconstruction further comprises:
   identifying source code related to a specific peripheral in the source code written in the pseudo assembly language,
   identifying settings for the specific peripheral in the second assembly language, and generating source code related to the specific peripheral written in the second assembly language.

7. The method of claim 3, wherein the contextual recognition and reconstruction further comprises:
   identifying bit manipulation in the source code written in the pseudo assembly language,
   determining whether the bit manipulation is valid in the second assembly language, and
   altering the bit manipulation, when the bit manipulation is not valid in the second assembly language, and
   generating source code written in the second assembly language which includes the altered bit manipulation.

8. The method of claim 2:
   wherein the prompting the user to customize the conversion of the source code written in the pseudo assembly language into the source code written in the second assembly language further comprises;
   displaying changes to the source code written in the pseudo assembly language to the user in a user interface, and
   receiving a command from the user through the user interface, wherein the source code written in the second assembly language is generated based on the command received from the user through the user interface.

9. The method of claim 8:
wherein the generated source code written in the second assembly language includes the changes to the source code written in the pseudo assembly language when a command indicates that the user has accepted the changes,
wherein the generated source code written in the second assembly language does not include changes to the source code written in the pseudo assembly language when the command indicates that the user rejected the changes, and
wherein the generated source code written in the second assembly language includes the changes to the source code written in the pseudo assembly language and includes changes to the source code made by the user through the user interface when the command indicates that the user further customized the changes through the user interface.

10. The method of claim 2:
wherein the optimizing the source code written in the second assembly language further comprises at least one of,
replacing multiple operations relating to a single working register with a single comprehensive operation relating to the single working register,
replacing branch instructions with new branch instructions which increase the efficiency of a control flow of the source code,
replacing multiple instructions relating to a working register with a single instruction that writes a desired value directly into a desired location without the use of a working register,
replacing macros for performing 16-bit operations with actual 16-bit operations,
removing one or more source code segments where a duplication operation or a register write is subsequently overwritten without first being used, and
replacing operations with new operations that utilize fewer central processing unit cycles.

11. The method of claim 1:
wherein the source code written in the first assembly language is input from a first source code file,
the method further comprising outputting the source code written in the second assembly language to a second source code file.

12. The method of claim 11:
wherein the source code written in the first assembly language is input from multiple first source code files, and
wherein the source code written in the second assembly language is output into multiple second source code files.

13. An apparatus, comprising:
a memory comprising instructions; and
a processor configured to execute the instructions stored on the memory,
wherein the processor is further configured, when executing the instructions stored on the memory, to,
translate source code written in a first assembly language for implementation by a Programmable Interface Controller (PIC) microcontroller into source code written in an pseudo assembly language;
wherein the translating comprises converting a set of sequential instructions of the source code written in the first assembly language to a set of sequential instructions, respectively, written in the pseudo assembly language;
convert the source code written in the pseudo assembly language into source code written in a second assembly language for implementation by a non-PIC microcontroller;
wherein the converting the source code written in the pseudo assembly language further comprises;
identifying a first source code segment written in the pseudo assembly language that includes a conditional statement for checking a status of a bit in a register of the PIC microcontroller;
generating a first source code segment written in the second assembly language that implements an interrupt service routine for the non-PIC microcontroller in response to the identifying.

14. The apparatus of claim 13:
wherein the processor is further configured, when executing the instructions stored on the memory, to prompt a user to customize the conversion of the source code written in the pseudo assembly language into the source code written in the second assembly language, and to optimize the source code written in the second assembly language.

15. The apparatus of claim 13:
wherein the processor is further configured, when executing the instructions stored on the memory, to;
apply contextual recognition and reconstruction to the source code written in the pseudo assembly language to generate the source code written in the second assembly language, wherein the contextual recognition and reconstruction further comprises determining an objective of a segment of the source code written in the pseudo language;
generate a segment of source code written in the second assembly language that achieves the objective of the segment of the source code written in the pseudo assembly language.

16. The apparatus of claim 15, wherein the processor is further configured, when executing the instructions stored on the memory, to:
look up the source code segment of the source code written in the pseudo assembly language in a data store,
determine whether the data store contains the source code segment written in the second assembly language that achieves the same objective as the source code segment of the source code written in the pseudo assembly language, and
replace the source code segment of the source code written in the pseudo assembly language with the source code segment written in the second assembly language in the generated source code written in the second assembly language.

17. The apparatus of claim 13, wherein the processor is further configured, when executing the instructions stored on the memory, to:
display changes to the source code written in the pseudo assembly language to the user in a user interface, and
receive a command from the user through the user interface,
wherein the source code written in the second assembly language is generated based on the command received from the user through the user interface.

18. The apparatus of claim 14:
wherein the processor is further configured, when executing the instructions stored on the memory, to perform at least one of the following;

replace multiple operations relating to a single working register with a single comprehensive operation relating to the single working register, replace branch instructions with new branch instructions which increase the efficiency of a control flow of the source code, replace multiple instructions relating to a working register with a single instruction that writes a desired value directly into a desired location without the use of a working register, replace macros for performing 16-bit operations with actual 16-bit operations, remove one or more source code segments where a duplication operation or a register write is subsequently overwritten without first being used, and replace operations with new operations that utilize fewer central processing unit cycles.

19. A non-transitory computer readable medium comprising instructions, when executed by a processor, causes the processor to implement a method, the method comprising:

translating source code written in a first assembly language to be implemented by a first microcontroller into source code written in an pseudo assembly language;

wherein the translating comprises converting a set of sequential instructions of the source code written in the first assembly language to a set of sequential instructions, respectively, written in the pseudo assembly language;

converting the source code written in the pseudo assembly language into source code written in a second assembly language for implementation by a non-PIC microcontroller;

wherein the converting the source code written in the pseudo assembly language further comprises;

identifying a first source code segment written in the pseudo assembly language that includes a conditional statement for checking a status of a bit in a register of the PIC microcontroller;

generating a first source code segment written in the second assembly language that implements an interrupt service routine for the non-PIC microcontroller in response to the identifying.

20. The non-transitory computer readable medium of claim 19, the method further comprising:

optimizing the source code written in the second assembly language, and prompting a user to customize the conversion of the source code written in the pseudo assembly language into the source code written in the second assembly language.

21. The non-transitory computer readable medium of claim 19, wherein the converting further comprises:

applying contextual recognition and reconstruction to the source code written in the pseudo assembly language to generate the source code written in the second assembly language;

wherein the contextual recognition and reconstruction further comprises determining an objective of a segment of the source code written in the pseudo language;

generating a segment of source code written in the second assembly language that achieves the determined objective of the segment of the source code written in the pseudo assembly language.

22. The non-transitory computer readable medium of claim 21, wherein the contextual recognition and reconstruction further comprises:

looking up the source code segment of the source code written in the pseudo assembly language in a data store, determining whether the data store contains the source code segment written in the second assembly language that achieves the same objective as the source code segment of the source code written in the pseudo assembly language, and replacing the source code segment of the source code written in the pseudo assembly language with the source code segment written in the second assembly language in the generated source code written in the second assembly language.

23. The non-transitory computer readable medium of claim 20:

wherein the prompting the user to customize the conversion of the source code written in the pseudo assembly language into the source code written in the second assembly language further comprises;

displaying changes to the source code written in the pseudo assembly language to the user in a user interface, and receiving a command from the user through the user interface, wherein the source code written in the second assembly language is generated based on the command received from the user through the user interface.

24. The non-transitory computer readable medium of claim 20:

wherein the optimizing the source code written in the second assembly language further comprises at least one of, replacing multiple operations relating to a single working register with a single comprehensive operation relating to the single working register, replacing branch instructions with new branch instructions which increase the efficiency of a control flow of the source code, replacing multiple instructions relating to a working register with a single instruction that writes a desired value directly into a desired location without the use of a working register, replacing macros for performing 16-bit operations with actual 16-bit operations, removing one or more source code segments where a duplication operation or a register write is subsequently overwritten without first being used, and replacing operations with new operations that utilize fewer central processing unit cycles.

* * * * *